United States Patent
Smith et al.

(10) Patent No.: US 8,378,853 B2
(45) Date of Patent: Feb. 19, 2013

(54) INTELLIGENT CREW ALERTING SYSTEM AND METHOD FOR AIRCRAFT AND OTHER VEHICLE APPLICATIONS

(75) Inventors: Brian James Smith, Peyton, CO (US); Billy Durham, Phoenix, AZ (US); Jeff Vanderzweep, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 610 days.

(21) Appl. No.: 12/621,154

(22) Filed: Nov. 18, 2009

(65) Prior Publication Data

US 2011/0115649 A1 May 19, 2011

(51) Int. Cl.
G08B 23/00 (2006.01)
(52) U.S. Cl. ......................... 340/963; 340/945
(58) Field of Classification Search ............ 340/963
See application file for complete search history.

(56) References Cited

U.S. PATENT DOCUMENTS

| | | | |
|---|---|---|---|
| 6,208,955 B1 | 3/2001 | Provan et al. | |
| 6,912,453 B2 | 6/2005 | Le Draoullec et al. | |
| 6,993,420 B2 | 1/2006 | Le Draoullec et al. | |
| 7,121,509 B2 | 10/2006 | Cordina et al. | |
| 7,260,453 B2 | 8/2007 | Poier et al. | |
| 7,437,221 B2 | 10/2008 | Hardman et al. | |
| 2002/0120375 A1* | 8/2002 | Draoullec et al. | 701/29 |
| 2006/0022845 A1 | 2/2006 | Fischer | |
| 2008/0154441 A1* | 6/2008 | Harrison et al. | 701/3 |
| 2008/0284618 A1 | 11/2008 | Fabas et al. | |
| 2009/0015437 A1 | 1/2009 | Campagne et al. | |
| 2010/0083056 A1* | 4/2010 | Spier et al. | 714/47 |

FOREIGN PATENT DOCUMENTS

EP  0721414 B1  6/1997

OTHER PUBLICATIONS

Frantz Iwu & Ian Toyn, "Modelling and Analysing Fault Propagation in Safety-Related Systems," 2003, IEEE.*
Iwu, et al.; Modelling and Analysing Fault Propagation in Safety-Related Systems; Proceedings of the 28th Annual NASA Goddard Software Engineering Workshop (SEW '03) Computer Society, 2003.
Larsson, et al.; Real-Time Root Cause Analysis for Complex Technical Systems; Joint 8th IEEE HFPP/13th HPRCT, 2007.
Sarka, et al.; Fault Diagnosis and Isolation in Aircraft Gas Turbine Engines; 2008 American Control Conference, Washington, USA, Jun. 11-13, 2008.
EP Search Report, EP 10186472.6-1232 dated Jul. 3, 2011.

* cited by examiner

*Primary Examiner* — Travis Hunnings
(74) *Attorney, Agent, or Firm* — Ingrassia Fisher & Lorenz, P.C.

(57) ABSTRACT

A method of managing alerts associated with the operation of an aircraft is provided. The method maintains an alert model database that correlates root causes to alerts associated with onboard aircraft subsystems. During operation of the aircraft, the method receives first alert data indicative of at least one alert of a first onboard aircraft subsystem, and traverses the alert model database to determine a root cause of the first alert data. The root cause (or some indicia thereof) can then be displayed on a display element.

18 Claims, 5 Drawing Sheets

INTELLIGENT CREW ALERTING SYSTEM AND METHOD FOR AIRCRAFT AND OTHER VEHICLE APPLICATIONS

TECHNICAL FIELD

Embodiments of the subject matter described herein relate generally to vehicle systems and subsystems. More particularly, embodiments of the subject matter relate to a crew alerting system that generates alert messages associated with the operation of various onboard subsystems.

BACKGROUND

Commercial aircraft currently utilize some type of crew alerting or warning system that alerts the flight deck crew of issues, problems, required maintenance, or other conditions associated with the onboard aircraft systems and subsystems. The primary goal of such alerting systems is to quickly inform the flight crew of any conditions or status that might require attention or responsive action. Although certain regulatory agencies (such as the United States Federal Aviation Agency) mandate the deployment of crew alerting systems, the specific manner in which a crew alerting system is implemented, the type of alert messages, and other operational details may remain unspecified. Consequently, crew alerting systems and the alert messages generated and supported by crew alerting systems are typically defined and configured by the airframe manufacturers (such as Boeing, Airbus, and McDonnell Douglas), and each aircraft type may have a different crew alerting system and/or a different alert message format.

A crew alerting system monitors various avionics subsystems that reside onboard the host aircraft. Avionics subsystems onboard the aircraft generate specific alert or warning messages that are based on internal checks and diagnostics. These messages are usually displayed on the primary flight displays in the flight deck of the aircraft in real time for viewing by the flight crew. Alert messages are generally categorized as to their severity or importance, which assists the crew in focusing on the most important or urgent issues. In certain situations, alert messages can significantly increase the workload of the flight crew, especially if a high number of alert messages are displayed concurrently or over a short period of time. Moreover, alert messages typically include alphanumeric codes, which the flight crew may need to understand and interpret on the fly. The flight crew may also be required to enter alert messages into a logbook or electronic database, consult a book or electronic database of response procedures for specified alert messages, or otherwise manage and respond to the alert messages.

BRIEF SUMMARY

A method is provided for managing alerts associated with the operation of an aircraft. The method receives alert data indicative of alerts for at least one onboard aircraft subsystem, and processes the received alert data to determine an originating cause of the alerts. The method continues by presenting indicia of the originating cause in a human-understandable format.

Also provided is another method of managing alerts associated with the operation of a vehicle. The method maintains an alert model database that correlates root causes to alerts associated with subsystems onboard the vehicle. The method receives first alert data indicative of at least one alert of a first onboard subsystem, traverses the alert model database to determine a root cause of the first alert data, and displays indicia of the root cause on a display element.

A system for managing alerts associated with the operation of an aircraft is also provided. The system includes a processing architecture configured to carry out processor-executable instructions, a processor-readable medium accessible by the processing architecture, and processor-executable instructions stored on the processor-readable medium. When executed by the processor architecture, the processor-executable instructions cause the processor architecture to carry out a method that involves receiving first alert data indicative of at least one alert of a first onboard aircraft subsystem, and second alert data indicative of at least one alert of a second onboard aircraft subsystem. The method continues by analyzing the received first alert data and the received second alert data to determine a common cause of the at least one alert of the first onboard aircraft subsystem and of the at least one alert of the second onboard aircraft subsystem. Then, the method obtains a recommended response to the common cause.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
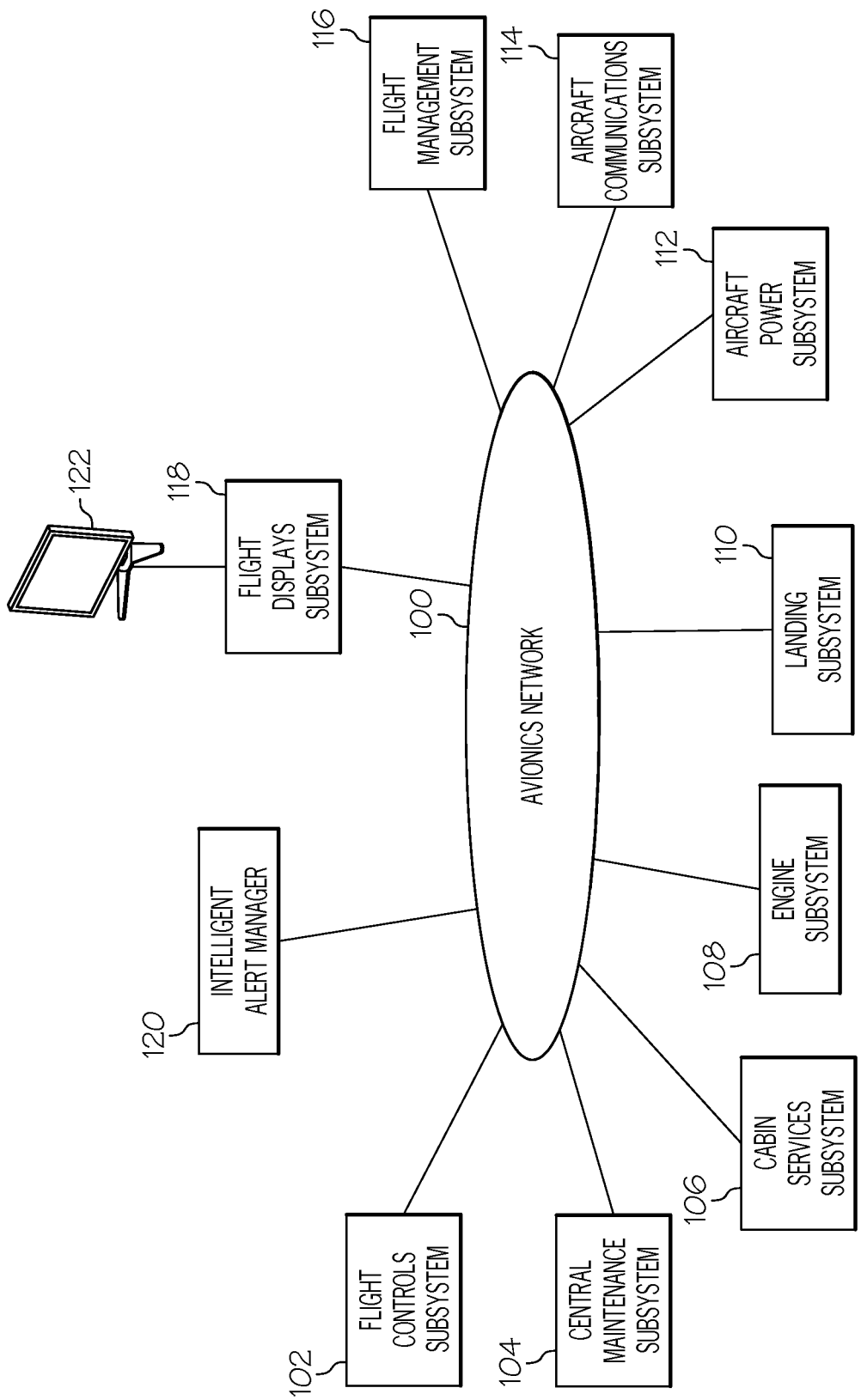
FIG. 1 is a schematic representation of various onboard aircraft subsystems.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals.

Indeed, when implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Conventional crew alerting systems for vehicles such as aircraft could be enhanced with the techniques and technologies described herein to improve their effectiveness and user-friendliness. In this regard, the crew alerting system described here reduces "clutter" associated with the generation and display of multiple concurrent alert messages, which could overtax the operating crew, driver, pilot, or navigator of the vehicle by adding workload. The crew alerting system described here also reduces the time needed to interpret and respond to alert messages. In addition, the crew alerting system described here intelligently analyzes and considers the status and possible causes of alert messages across multiple onboard subsystems. Such an integrated approach is desirable to provide a higher level "big picture" view of the monitored systems and overall health of the vehicle.

The alerting system described here can be deployed with any vehicle, including, without limitation: aircraft; watercraft; road vehicles such as cars, buses, trucks, and motorcycles; spacecraft; trains; subways; specialty equipment (e.g., construction equipment, factory equipment, etc.); trams; and the like. The particular embodiments described below relate to aircraft applications, however, the subject matter is not limited or restricted to such aircraft applications.

The crew alerting system described here gathers and analyzes alert messages that originate from different onboard subsystems. Individual alert messages and/or patterns of alert messages are considered to arrive at a cause of the alert messages. In certain embodiments, the crew alerting system traverses a pre-loaded alert model database that defines cascading relationships between different alert messages and/or that correlates originating or root causes with particular patterns of alert messages. Rather than automatically presenting all alert messages to the flight crew, the crew alerting system presents the originating/root cause of the alert messages, which alleviates much of the workload associated with conventional systems. In addition, the crew alerting system could determine and present to the flight crew one or more recommended responses to the originating/root cause.

FIG. 1 is a schematic representation of various onboard aircraft subsystems that cooperate to form an avionics network 100. This embodiment of the avionics network 100 includes, without limitation: a flight controls subsystem 102; a central maintenance subsystem 104; a cabin services subsystem 106; an engine subsystem 108; a landing subsystem 110; an aircraft power subsystem 112; an aircraft communications subsystem 114; a flight management subsystem 116; a flight displays subsystem 118; and an intelligent alert manager 120. The flight displays subsystem 118 includes or cooperates with at least one display element 122. In practice, the avionics network 100 could be implemented with some redundancy. For example, the avionics network 100 might include redundant, independent, and parallel instantiations of one or more subsystems, e.g., the flight displays subsystem 118, the intelligent alert manager 120, the flight controls subsystem 102, or the like. Moreover, the particular subsystems used by an aircraft need not be identical to those depicted in FIG. 1. Indeed, the number, type, and functionality of the onboard subsystems may vary from one airframe to another and from one aircraft to another, and the subsystems shown in FIG. 1 are not intended to limit or restrict the scope of the subject matter described here.

The intelligent alert manager 120 is described in more detail below with reference to FIGS. 2-5. The other subsystems utilized by the avionics network 100 need not be specially configured or customized to support the crew alerting techniques, methodologies, and technologies described here. Indeed, certain embodiments of the intelligent alert manager 120 are suitably configured for compliance with legacy avionics subsystems such that those legacy subsystems need not be modified or customized for deployment with the avionics network 100. This description assumes that each of the onboard subsystems shown in FIG. 1 is capable of independently monitoring itself for occurrences of conditions, states, or status that might require issuance of an alert or warning message. Thus, each subsystem is suitably configured to generate and issue alert messages that relate to its operation, functionality, operating state, condition, etc.

In certain embodiments, a given avionics subsystem will have a finite number of possible alert messages associated therewith. In other words, each subsystem will have a predefined set, list, matrix, table, or array of alert messages that could be active or inactive at any given point in time. For example, the engine subsystem 108 may have an associated alert message that relates to an unusual operating condition or status of the engine, another associated alert message that relates to an engine malfunction, and yet another associated alert message that relates to high oil temperature. As another example, the aircraft communications subsystem 114 may have one associated alert message that relates to a malfunctioning antenna, another associated alert message that relates to a datalink function being manually disabled, and yet another associated alert message that relates to a transmit switch being depressed for too long. The number of different alert messages, the contextual meaning of the alert messages, and the conditions under which the alert messages are generated or activated will be defined for each particular avionics subsystem.

An alert message includes, conveys, or is otherwise indicative of alert data related to an alert that has issued from the respective avionics subsystem. In some embodiments, an alert message could simply indicate (using, for example, one or more bits, a voltage level, or a flag) whether a predefined alert message is active or inactive. In such embodiments, some other intelligence in the avionics network 100 (possibly resident at the intelligent alert manager 120 and/or the flight displays subsystem 118) maintains a list or table of predefined alert messages and changes the status of each alert to "active" or "inactive" depending upon the content of the alert messages. In other embodiments, an alert message could convey contextual information related to an alert, for example, a short alphanumeric message or code, a brief descriptor, or the like. In such embodiments, the flight displays subsystem 118 could be suitably configured to render the contextual information associated with the alert messages. The exemplary embodiments described below assume that each alert message includes or conveys an active/inactive flag along with an identifier that corresponds to one of the predefined alerts managed by the crew alerting system. An alert message may also include, convey, or otherwise indicate time stamp information for the associated alert. The time stamp information indicates the date/time when the alert originated, the date/time when the alert message was issued, or the like.

The intelligent alert manager 120 can be deployed as a logical processing module in one or more onboard hardware components, as described in more detail below. In certain embodiments, the intelligent alert manager 120 functions as a high level manager and interface for alert messages issued by the other onboard avionics subsystems. Thus, the intelligent alert manager 120 may be suitably configured to receive the alert messages from the avionics subsystems, process the alert messages, and manage the presentation of alert messages (if needed) while cooperating with the flight displays subsystem 118. In this regard, the intelligent alert manager 120 functions as a go-between for the flight displays subsystem 118 by filtering, condensing, distilling, or otherwise reducing the number of alert messages that are actually rendered on the display element 122. The intelligent alert manager may also be configured to analyze and process received alert messages to determine one or more originating or root causes of the alerts and, if so desired, to determine one or more responses, actions, or procedures for handling or resolving the alerts.

Figure 2:
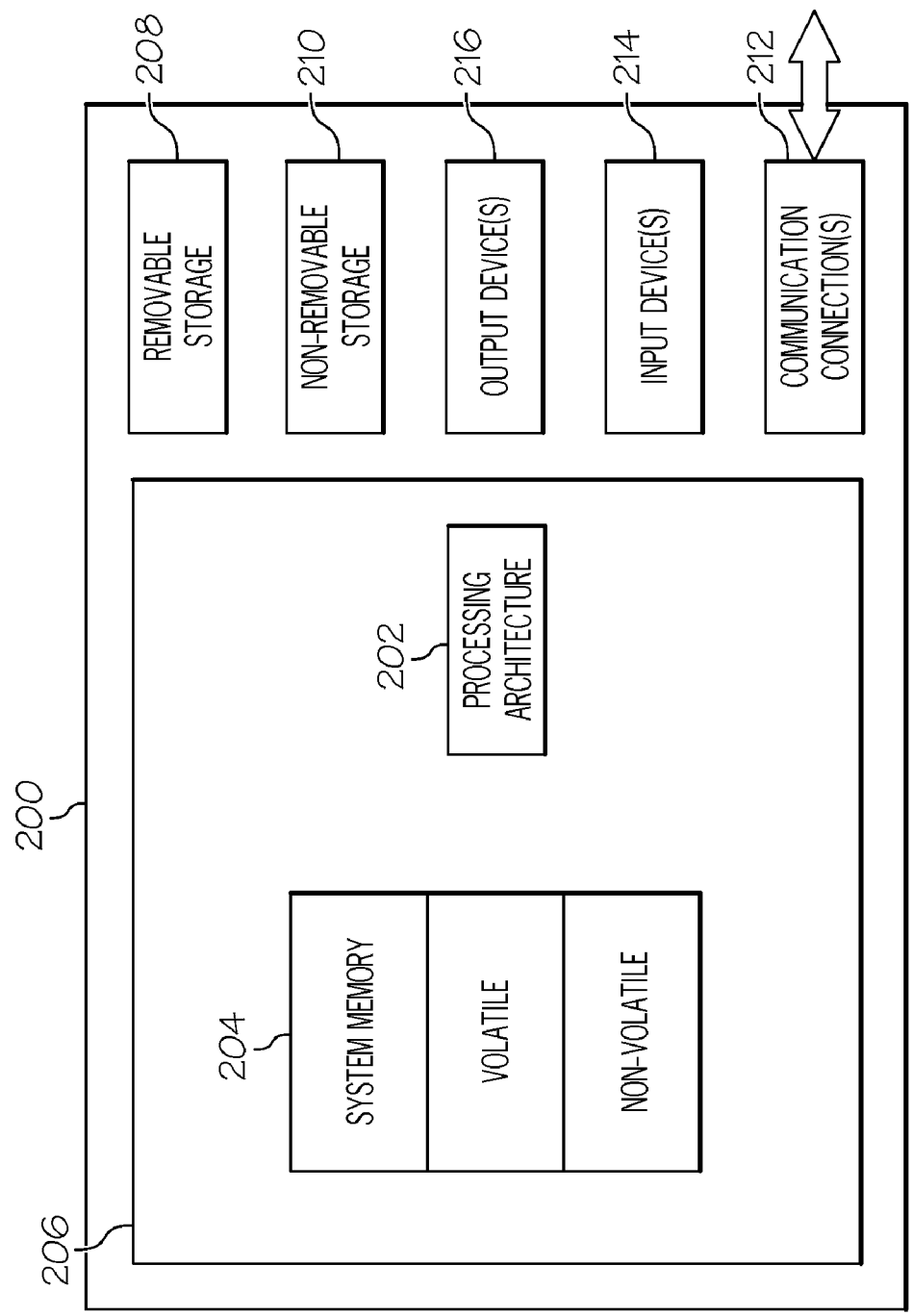
FIG. 2 is a schematic representation of an exemplary computing module that could be used to implement the intelligent alert manager depicted in FIG. 1.

The host aircraft may utilize any number of computing devices, processor-based modules, computer architectures, or the like, which may cooperate with or form a part of the avionics network. For example, the host aircraft may employ one or more general computing modules that are suitably configured to support the crew alerting features and methodologies described here. In this regard, FIG. 2 is a schematic representation of an exemplary computing module 200 that could be used to implement the intelligent alert manager 120 depicted in FIG. 1. One or more instantiations of the computing module 200 may be utilized in a deployment of a crew alerting system onboard a host aircraft. The illustrated computing module 200 is only one example of a suitable implementation, and it is not intended to suggest any limitation as to the scope of use or functionality of any practical embodiment. Other well known computing systems, environments, and/or configurations that may be suitable for use include, but are not limited to, personal computers, server computers, hand-held or laptop devices, personal digital assistants, mobile telephones, multiprocessor systems, microprocessor-based systems, programmable consumer or military grade electronics, network PCs, minicomputers, mainframe computers, distributed computing environments that include any of the above systems or devices, and the like.

The computing module 200 and certain aspects of the exemplary embodiments may be described in the general context of computer-executable instructions, such as program modules, application code, or software executed by one or more computers or other devices. Generally, program modules include routines, programs, objects, components, data structures, and/or other elements that perform particular tasks or implement particular abstract data types. Typically, the functionality of the program modules may be combined or distributed as desired in various embodiments.

The computing module 200 typically includes or cooperates with at least some form of tangible computer-readable or processor-readable media. In this regard, processor-readable media can be any available media that can be accessed by the computing module 200 and/or by applications executed by the computing module 200. By way of example, and not limitation, processor-readable media may comprise tangible computer storage media, which may be volatile, nonvolatile, removable, or non-removable media implemented in any method or technology for storage of information such as processor-executable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing module 200.

Referring again to FIG. 2, in its most basic configuration, the computing module 200 typically includes at least one processing architecture 202 and a suitable amount of memory 204. This basic configuration is identified in FIG. 2 by reference number 206. The processing architecture 202 is preferably configured to execute and carry out processor-executable instructions associated with the crew alerting techniques, operations, and methods described herein. Accordingly, processor-readable media used by the computing module 200 is accessible by the processing architecture 202, and the processor-readable media stores the appropriate processor-executable instructions needed to support the cognitive workload assessment techniques.

Depending on the exact configuration and type of computing module 200, the memory 204 may be volatile (such as RAM), non-volatile (such as ROM, flash memory, etc.) or some combination of the two. Additionally, the computing module 200 may also have additional features/functionality. For example, the computing module 200 may also include additional storage (removable and/or non-removable) including, but not limited to, magnetic or optical disks or tape. Such additional storage is represented in FIG. 2 by the removable storage 208 and the non-removable storage 210. The memory 204, the removable storage 208, and the non-removable storage 210 are all examples of computer storage media as defined above. One or more memory devices or elements of the computing device 200 can be used to store data and information as necessary to support the various alert management and assessment techniques described here. For example, a memory element could be configured to store an alert model database, a response database, and/or other datasets or databases that support the intelligent alerting schemes presented here (the alert model and response databases are described in more detail below).

The computing module 200 may also contain communications connection(s) 212 that allow the computing module 200 to communicate with other onboard devices or modules, such as the other networked avionics subsystems depicted in FIG. 1. Depending upon the implementation, the communication connection(s) 212 may include, without limitation, suitably configured interfaces that allow the computing module 200 to communicate with the avionics network 100 and devices, components, modules, or elements that are communicatively coupled to the avionics network 100.

The computing module 200 may also include or communicate with certain input device(s) 214 such as a keyboard, mouse or other pointing device, pen, voice input device, touch input device, etc. The computing module 200 may also include or communicate with output device(s) 216 such as a display, speakers, printer, or the like. All of these devices are well know in the art and need not be discussed at length here. During operation of the computing module 200, an input device 214 and/or an output device 216 may be utilized to facilitate the loading or updating of the alert model and response databases that support the intelligent crew alerting technique. As another example, an output device 216 may generate a display, a chart, a table, or a report that conveys empirical or statistical data associated with issued alert messages, originating causes or root causes determined by the crew alerting system, or the like. The computing module 200 may also be suitably configured to interpret the results, or assist in the interpretation of the results.

Figure 3:
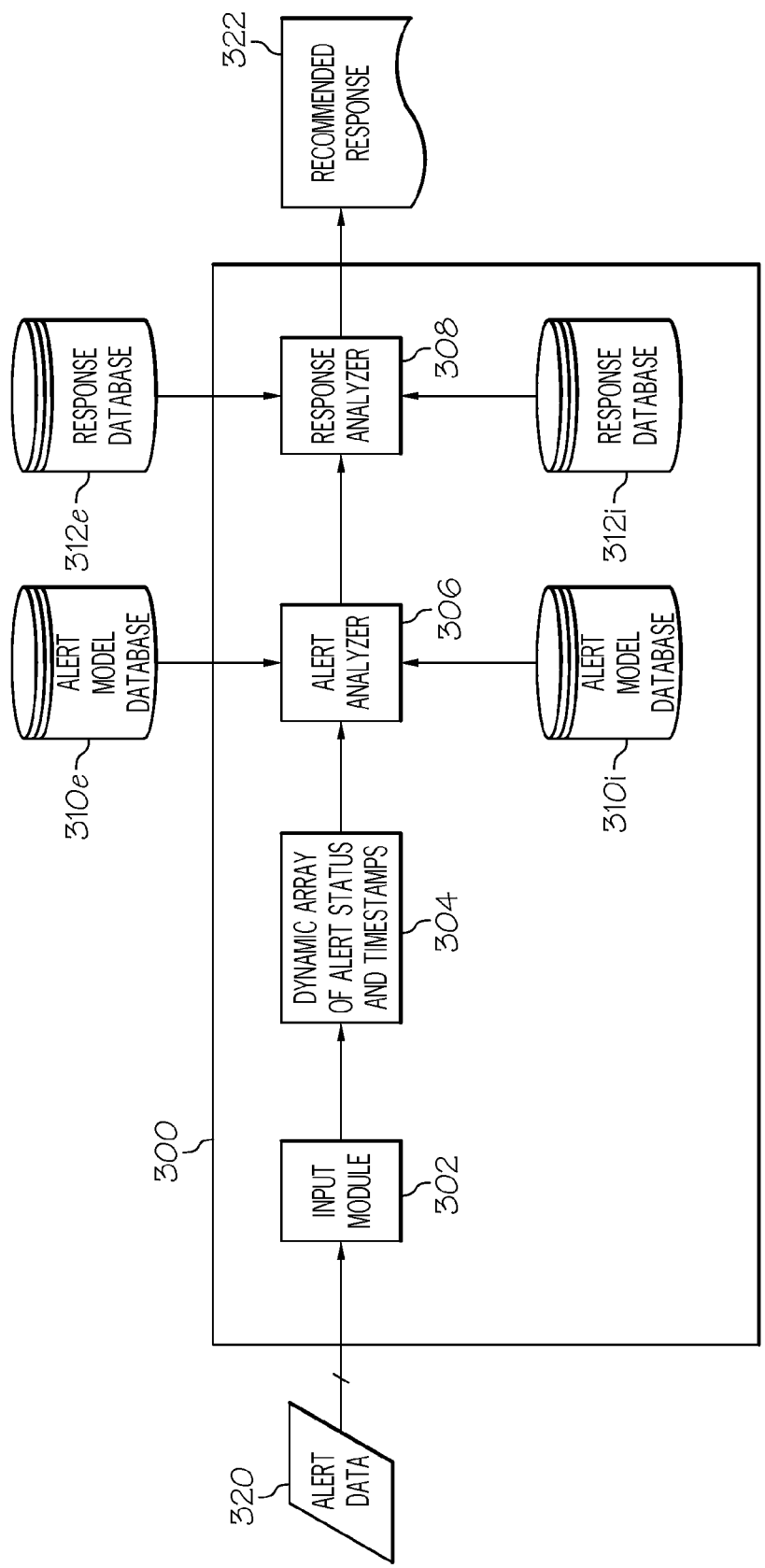
FIG. 3 is a schematic representation of an exemplary embodiment of an intelligent alert manager.

FIG. 3 is a schematic representation of an exemplary embodiment of an intelligent alert manager 300 suitable for use with a crew alerting system. The intelligent alert manager 120 depicted in FIG. 1 may be configured as shown in FIG. 3, which illustrates certain logical, processing, and functional modules or components of the intelligent alert manager 300. This embodiment of the intelligent alert manager 300 generally includes, without limitation: an input module 302; a dynamic array 304 of alert status and time stamps; an alert analyzer 306; and a response analyzer 308. The intelligent alert manager 300 includes or cooperates with an alert model database 310 and a response database 312, either of which may be considered to be internal to or integrated with the intelligent alert manager 300, or external to the intelligent alert manager 300. In some embodiments, the alert model database 310 (and/or the response database 312) could be distributed such that one portion of it is internal to or integrated with the intelligent alert manager 300, while another portion of it is external to the intelligent alert manager 300. In FIG. 3, the alert model database 310*i* and the response database 312*i* are internal to or integrated with the intelligent alert manager 300, while the alert model database 310*e* and the response database 312*e* are external to the intelligent alert manager 300.

The input module 302 receives alert data 320 from at least one onboard aircraft subsystem, via the onboard avionics network. Thus, the input module 302 is suitably configured for compliance with the particular data communication protocol(s), data format, and other functional characteristics of the various subsystems onboard the host aircraft. If a received alert message does not include time stamp information, then the input module 302 (and/or some other element or module of the intelligent alert manager 300) adds a time stamp upon receipt. The dynamic array 304 is then created or updated such that it accurately indicates the current active/inactive status of the different possible alerts supported by the host aircraft. For this particular embodiment, the dynamic array 304 will identify all of the possible alerts, indicate whether each alert is active or inactive, and include the time stamp information for each active alert.

The dynamic array 304 can be updated in real time or near real time in an ongoing manner during operation of the host aircraft. Moreover, the dynamic array 304 may be operationally coupled to the alert analyzer 306, which in turn can access the alert model database 310. As described in more detail below, the alert analyzer 306 processes the received alert data in an attempt to determine or isolate a potential cause (or more than one possible cause) of an active alert, all the active alerts, or any subset or group of active alerts. The alert analyzer 306 accesses and traverses the alert model database 310 while processing the alert data. If the alert analyzer 306 determines an originating or root cause of at least one active alert, then the response analyzer 308 can attempt to determine, retrieve, or obtain an appropriate response, procedure, or action that is associated with the determined cause. The response analyzer 308 accesses and traverses the response database 312 in an attempt to determine a recommended response. If applicable, the response analyzer 308 can generate an output that is indicative of the recommended response 322.

Figure 4:
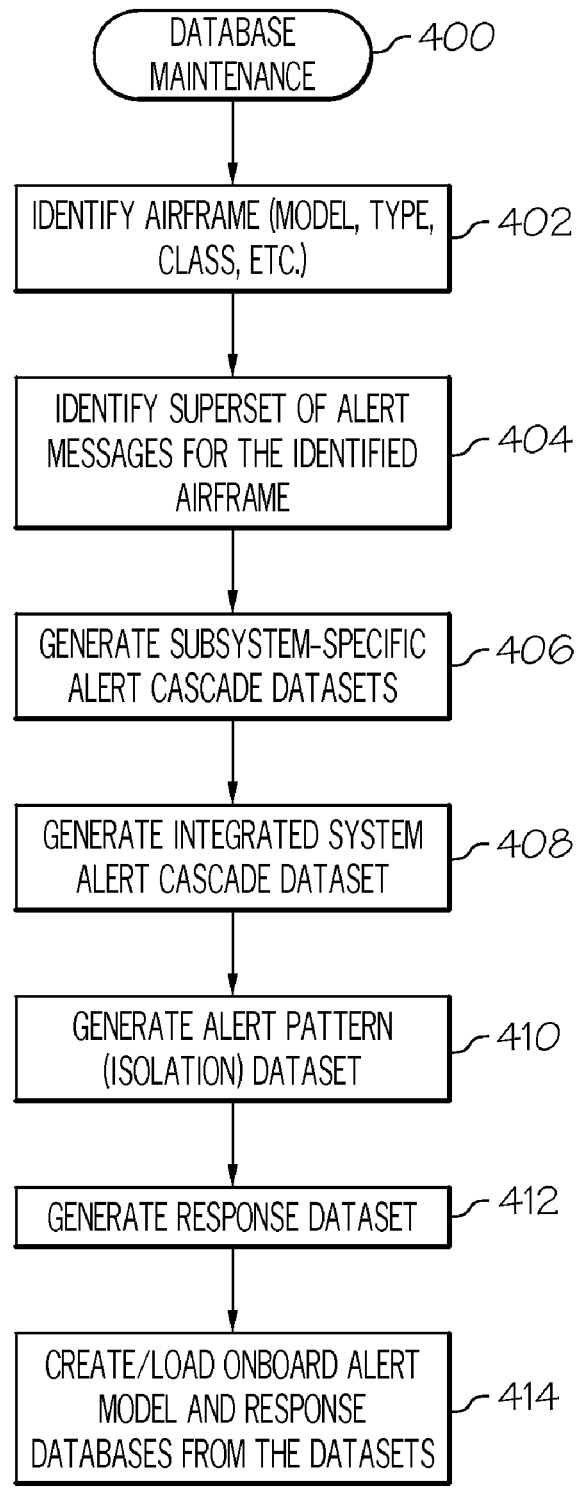
FIG. 4 is a flow chart that illustrates an exemplary embodiment of a database maintenance process.

An embodiment of the crew alerting system described here includes or cooperates with one or more onboard loadable databases (e.g., the alert model database 310 and the response database 312) that can be populated and updated as needed to suit the needs of the particular airframe, the particular aircraft, the specific avionics subsystems onboard the aircraft, or the like. The uploadable databases are suitably configured and formatted such that the fundamental application software or code associated with the intelligent alert manager 300 need not be significantly modified (if at all) to support different combinations of avionics subsystems (which may be manufactured by different vendors), different airframes, different aircraft models, etc. In practice, these databases can be created, maintained, and updated using an appropriate system or application. Although not required, certain embodiments utilize ground-based equipment to maintain these databases and to upload these databases for use with the intelligent alert manager 120. In this regard, FIG. 4 is a flow chart that illustrates an exemplary embodiment of a database maintenance process 400. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein.

As explained above, the databases accessed by the intelligent alert manager 300 may be airframe-specific. Accordingly, the database maintenance process 400 may begin by identifying the particular airframe under consideration (task 402). In practice, the airframe could be identified by a model number, an airframe type, an airframe class, or the like. Generally, different aircraft based on the same airframe need not include the same set of onboard avionics subsystems (although typically many of the subsystems are the same). In other words, even if two aircraft share the same underlying airframe, the particular avionics subsystems onboard the two aircraft may differ. Accordingly, the process 400 could identify a superset of alerts and/or alert messages for the identified airframe (task 404). Ideally, the superset contemplates all of the possible alerts for any deployed aircraft that is based upon the identified airframe. Consequently, the superset might include some alerts that are not used by a particular aircraft. For example, the superset may include alerts or alert messages corresponding to an optional avionics subsystem that need not be deployed on all aircraft that share the designated airframe. In practice, specific alerts associated with each avionics subsystem could be provided by the subsystem vendor or manufacturer, by the airframe manufacturer, or the like.

The illustrated embodiment of the process 400 generates subsystem-specific alert cascade datasets for respective subsystems utilized by the designated airframe (task 406). As used here, a subsystem-specific alert cascade dataset defines certain cascading relationships between alerts for one avionics subsystem. Accordingly, the identified airframe could have a plurality of different subsystem-specific alert cascade datasets corresponding to a plurality of different subsystems. On the other hand, there is no requirement that all subsystems must have a respective subsystem-specific alert cascade dataset. In other words, there may be a scenario where a given avionics subsystem has no corresponding subsystem-specific alert cascade dataset.

A subsystem-specific alert cascade dataset defines or indicates the cascading relationships between alerts for a particular avionics subsystem. Cascading relationships may represent a parent-child association, a cause-and-effect association, and/or a "family tree" association between alerts. For example, if active, a given alert might cause one or more child alerts to activate. In turn, one of those child alerts might cause one or more grandchild alerts to activate, and so on. An active alert that has no parent alert (i.e., an originating alert that is not activated in response to any other alert) might be considered to be a root cause or an originating cause of other alerts that are activated as a result of that active alert. As used here, an "originating alert" has no parent or ancestor alert associated therewith, and a "terminating alert" has no child alert associated therewith. An originating alert, however, may have any number (including zero) of child and descendent alerts associated therewith, and a terminating alert could be activated in response to the activation of one or more parent alerts. Moreover, one or more cascading "generations" could be skipped in a given subsystem-specific alert cascade dataset.

The illustrated embodiment of the process 400 also generates an integrated system alert cascade dataset for the identified airframe (task 408). The integrated system alert cascade dataset defines certain cascading relationships between alerts from a plurality of different avionics subsystems. In other words, the integrated system alert cascade dataset contemplates associations between alerts that might traverse across different subsystems. Accordingly, the integrated system alert cascade dataset is conceptually similar to a subsystem-specific alert cascade dataset, however, the individual alerts are not restricted to a single avionics subsystem. Thus, the integrated system alert cascade dataset contemplates the scenario where an originating alert from a first subsystem initiates the activation of a descendent alert at a second subsystem (which in turn might initiate the activation of one or more alerts at yet a third subsystem). In practice, a particular subsystem could be "divorced" from the integrated system alert cascade dataset if the alerts generated by that particular subsystem are not influenced by the operation of any other subsystem and if the alerts generated by that particular subsystem do not influence the activation of alerts by any other (different) subsystem. In such a situation, a divorced subsystem need not be reflected in the integrated system alert cascade dataset.

The illustrated embodiment of the process 400 also generates an alert pattern or isolation dataset for the identified airframe (task 410). The alert pattern dataset defines or indicates relationships between: (1) originating alerts, originating causes, or root causes; and (2) certain patterns of active alerts, which may originate from the same onboard aircraft subsystem or from a plurality of different onboard aircraft subsystems. Unlike the cascade-based datasets described previously, the alert pattern dataset correlates originating causes or alert summaries with predefined combinations of active alerts, which may include active alerts across different avionics subsystems. Thus, the alert pattern dataset may have entries for particular patterns or combinations of active alerts, along with their corresponding originating alerts, originating causes, root causes, summaries or explanations, etc.

The illustrated embodiment of the process 400 also generates a response dataset for the identified airframe (task 412). The response dataset correlates originating causes, originating alerts, root causes, and/or alert summaries to recommended responses, procedures, and/or courses of action. In this regard, the recommendations address the corresponding causes and, if executed, are intended to resolve, alleviate, correct, fix, diagnose, treat, or otherwise address the underlying cause(s) of the alerts. The recommendations represent instructions or commands that can be performed or executed by the flight crew as necessary.

The subsystem-specific alert cascade datasets, the integrated system alert cascade dataset, the alert pattern dataset, and/or the response dataset could be generated by the subsystem vendors or manufacturers, or the datasets could be derived from empirical testing, bench testing, or analysis. These datasets could also be produced with the assistance of subject matter experts or experienced technicians having knowledge of certain cause-and-effect relationships between various alerts and alert messages, and knowledge of appropriate responses, corrective action, or procedures that are intended to address root or originating causes of crew alerts.

The datasets generated during the process 400 can be used to create the alert model and response databases utilized by the crew alerting system. In certain embodiments, these databases are loaded (task 414) into appropriate onboard storage media for use with the intelligent alert manager 300 (see FIG. 3). In this regard, task 414 may involve the use of ground-based database tools that create one or more loadable database files that can be transferred to the onboard storage media as needed. It should be appreciated that process 400 (or portions thereof) can be repeated as desired to contemplate changes to the subsystems used by the designated airframe, to update any of the datasets, or the like. This allows the crew alerting system to maintain updated databases without having to update the core application code associated with the intelligent alert manager 300.

Figure 5:
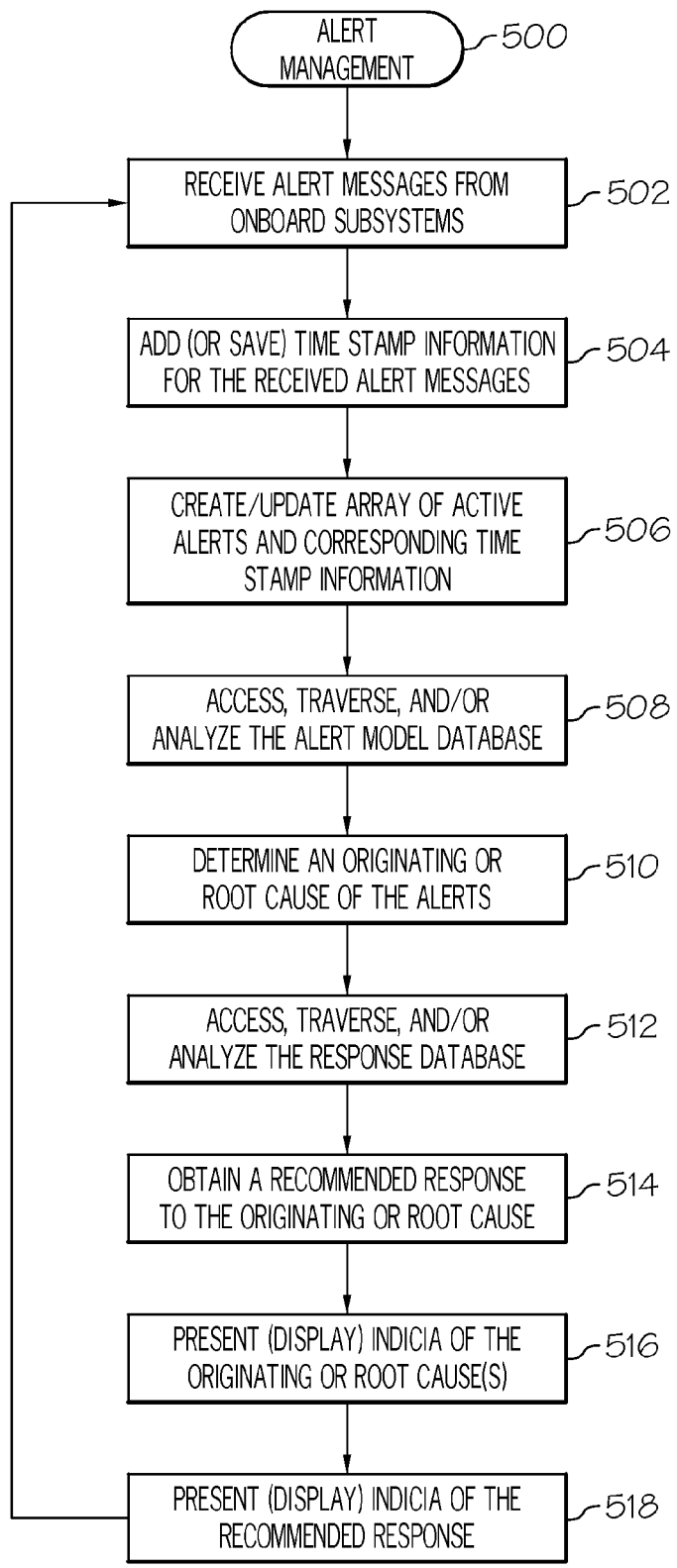
FIG. 5 is a flow chart that illustrates an exemplary embodiment of an alert management process.

FIG. 5 is a flow chart that illustrates an exemplary embodiment of an alert management process 500. The various tasks performed in connection with process 500 may be performed by software, hardware, firmware, or any combination thereof. For illustrative purposes, the following description of process 500 may refer to elements mentioned above in connection with FIGS. 1-3. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, a practical embodiment could omit one or more of the illustrated tasks (as long as the intended functionality of the process 500 is preserved).

Process 500 may begin by receiving alert data from at least one onboard aircraft subsystem (task 502). In typical embodiments, the alert data will include active/inactive alert flags and/or alert messages generated by a plurality of different onboard subsystems. The alert data may be indicative of any number of distinct alerts from any number of subsystems. Upon receipt, the received alert data can be processed by the intelligent alert manager in an appropriate manner. For example, upon receipt of an alert message or flag, process 500 adds time stamp information for that received message or flag. If the received alert message or flag already includes time stamp information, then process 500 may instead save or log the received time stamp information (task 504). In addition, this embodiment of process 500 creates or updates an array of active alerts and corresponding time stamp information (task 506). The array is updated to reflect the current state (active or inactive) of the different possible alerts that could be generated by the monitored subsystems. Thus, process 500 keeps track of active alerts in real time or near real time.

In an attempt to determine or isolate one or more causes of the active alerts, process 500 may access, traverse, and/or analyze an alert model database maintained by the crew alerting system (task 508). As mentioned previously, the loaded alert model database might include subsystem-specific alert cascade datasets, an integrated system alert dataset, and/or an alert pattern dataset, and any or all of these datasets could be polled during task 508. This example assumes that process 500 successfully determines at least one originating or root cause of the active alerts (task 510). If, however, no identifiable cause or origin of the active alerts is determined during task 510, then process 500 could exit or handle the received alert data in an appropriate manner. For example, active alerts could be displayed on the flight deck display element in a conventional manner without any filtering or indication of any underlying causes.

The determination of an originating or root cause might be based upon or otherwise influenced by the content of the alert model database. For example, process 500 might identify a cascaded alert from the received alert data and traverse the alert model database to find a parent alert from which the cascaded alert originated. This parent alert may itself correspond to an identifiable originating or root cause. Alternatively, an originating or root cause could be influenced by or otherwise related to this parent alert.

As another example, process 500 might identify a pattern or set of active alerts from the received alert data and traverse the alert model database to find a predetermined relationship between the detected pattern/set and an originating or root cause. In certain situations, the time stamp information corresponding to one or more received alerts is considered in connection with the isolation of an originating or root cause in this manner. In other words, the determination of an originating or root cause may be influenced at least in part by the time stamp information. As yet another example, process 500 could analyze alert data that is indicative of active alerts from two or more different onboard subsystems. In such situations, process 500 traverses the alert model database in an attempt to determine or isolate a common root cause of the active alerts, even though the active alerts originated from different subsystems.

An originating or root cause may be a top level alert from which other alerts are activated, a combination of top level alerts, or any condition, status, problem, state, issue, or reason related to active alerts. An originating or root cause may be associated with any one onboard subsystem, or it may be associated with a combination of multiple subsystems. For example, one root cause associated with the flight controls subsystem 112 (see FIG. 1) may be, without limitation, autolanding system disabled. As another example, a root cause associated with the landing subsystem 110 may be, without limitation, a hydraulics system malfunction. As yet another example, an originating or root cause that encompasses multiple subsystems could be, without limitation, a malfunction of the power distribution unit.

If process 500 successfully determines an originating or root cause of active alerts, then it may attempt to determine or obtain at least one recommended response to that cause. In this regard, process 500 could access, traverse, and/or analyze a response database maintained by the crew alerting system (task 512). As mentioned previously, the loaded response database might include recommended responses that are linked to certain root or originating causes, and this response database could be polled during task 512. This example assumes that process 500 obtains or retrieves a recommended response to the originating or root cause (task 514). If, however, no recommended response is found, then process 500 could exit or proceed to task 516.

In certain embodiments, process 500 presents some indicia of the originating or root cause(s) in a human-understandable format (task 516). In addition, process 500 presents some indicia of the recommended response(s) in a human-understandable format (task 518). In typical deployments, the crew alerting system cooperates with the flight displays subsystem 118 (see FIG. 1) to facilitate the display of the originating or root causes and any recommended responses on the display element 122. Displaying the recommended responses in this manner is desirable to reduce the workload of the flight crew and to allow the flight crew to quickly respond to active alerts in an effective manner. In contrast to conventional crew alerting systems that typically display all active alerts, the system and methodologies described here could "filter" or "hide" some relatively unimportant alert messages and selectively display other alert messages. That said, any or all underlying alert messages could be displayed if so desired by the flight crew.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of managing alerts associated with the operation of an aircraft, the method comprising:
   receiving alert messages indicative of predefined alerts for a plurality of different onboard aircraft subsystems, each of the onboard aircraft subsystems having a set of predefined alerts that can be active or inactive at any given point in time, and each of the alert messages indicating active or inactive status of one of the predefined alerts;
   processing active alerts identified in the received alert messages;
   determining an originating cause of the active alerts in response to the processing;
   presenting indicia of the originating cause in a human-understandable format;
   filtering the received alert messages to obtain a reduced number of received alert messages; and
   rendering the reduced number of received alert messages on a flight deck display element.

2. The method of claim 1, wherein receiving alert messages comprises receiving alert messages that convey contextual information related to the alerts.

3. The method of claim 1, wherein determining the originating cause comprises:
   accessing an alert model database that indicates cascading relationships between active alerts;
   identifying, from the received alert messages, a cascaded alert; and
   traversing the alert model database to find a parent alert from which the cascaded alert originated, wherein the originating cause is related to the parent alert.

4. The method of claim 1, wherein determining the originating cause comprises:
   accessing an alert model database that indicates relationships between originating causes and patterns of active alerts that originate from a plurality of different onboard aircraft subsystems;
   identifying, from the received alert messages, a pattern of active alerts; and traversing the alert model database to find a relationship between the pattern of active alerts and the originating cause.

5. The method of claim 1, wherein:
the received alert messages include time stamp information for the active alerts; and
determining the originating cause is influenced at least in part by the time stamp information.

6. The method of claim 1, further comprising:
obtaining a recommended response to the originating cause; and
presenting indicia of the recommended response in a human-understandable format.

7. The method of claim 6, wherein presenting indicia of the recommended response comprises displaying indicia of the recommended response on the flight deck display element.

8. The method of claim 6, wherein obtaining the recommended response comprises:
accessing a response database that correlates originating causes to recommended responses; and
retrieving, from the response database, the recommended response based upon the originating cause.

9. A method of managing alerts associated with the operation of a vehicle, the method comprising:
maintaining an alert model database that correlates root causes to alerts associated with subsystems onboard the vehicle;
receiving a plurality of alert messages from the subsystems onboard the vehicle;
traversing the alert model database to determine a root cause of the plurality of alert messages;
displaying indicia of the root cause on a display element;
filtering the received alert messages to obtain a reduced number of received alert messages; and
rendering the reduced number of received alert messages on the display element.

10. The method of claim 9, wherein:
the alert model database includes an alert cascade dataset that indicates cascading relationships between alerts of a first subsystem onboard the vehicle;
the traversing step traverses the alert cascade dataset to find a parent alert from which the plurality of alert messages originated; and
the root cause is related to the parent alert.

11. The method of claim 9, further comprising:
determining a recommended response to the root cause; and
displaying indicia of the recommended response on the display element.

12. The method of claim 11, wherein determining the recommended response comprises:

traversing a response database that correlates root causes to recommended responses; and
retrieving, from the response database, the recommended response based upon the root cause.

13. A system for managing alerts associated with the operation of an aircraft, the system comprising:
a processing architecture configured to carry out processor-executable instructions;
a processor-readable medium accessible by the processing architecture; and
processor-executable instructions stored on the processor-readable medium, wherein, when executed by the processor architecture, the processor-executable instructions cause the processor architecture to carry out a method comprising:
receiving a plurality of alert messages from a first onboard aircraft subsystem and a second onboard aircraft subsystem;
analyzing the received alert messages to determine a common cause of the alert messages; and
obtaining a recommended response to the common cause;
filtering the received alert messages to obtain a reduced number of received alert messages; and
rendering the reduced number of received alert messages on a display element of the aircraft.

14. The system of claim 13, further comprising an alert model database accessible by the processing architecture, wherein the alert model database correlates root causes to alerts associated with onboard aircraft subsystems, and wherein analyzing the received alert messages comprises accessing the alert model database to identify the common cause based upon the received alert messages.

15. The system of claim 14, wherein:
the alert model database includes an alert cascade dataset that indicates cascading relationships between alerts of the first onboard aircraft subsystem and the second onboard aircraft subsystem; and
the common cause corresponds to a parent alert from which the plurality of alert messages originated.

16. The system of claim 14, wherein the alert model database is an airframe-specific loadable database.

17. The system of claim 13, further comprising a response database accessible by the processing architecture, wherein the response database correlates root causes to recommended responses, and wherein obtaining the recommended response comprises accessing the response database to identify the recommended response based upon the common cause.

18. The system of claim 17, wherein the response database is an airframe-specific loadable database.

* * * * *